O C RICHARDSON.
MEASURING AND LEVELING INSTRUMENT.
APPLICATION FILED DEC. 27, 1913.
1,127,809.
Patented Feb. 9, 1915.
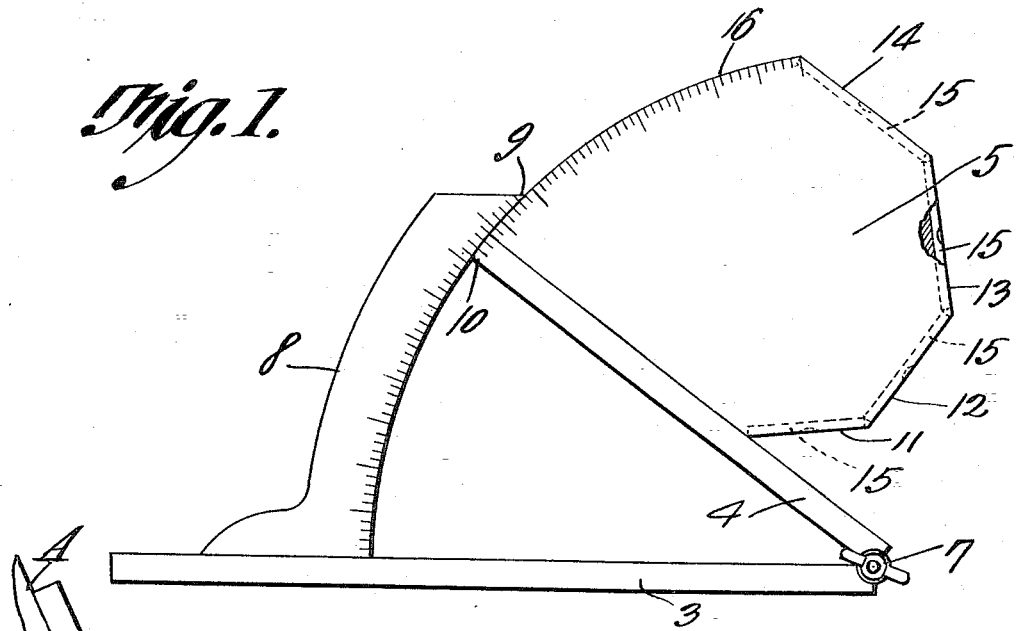
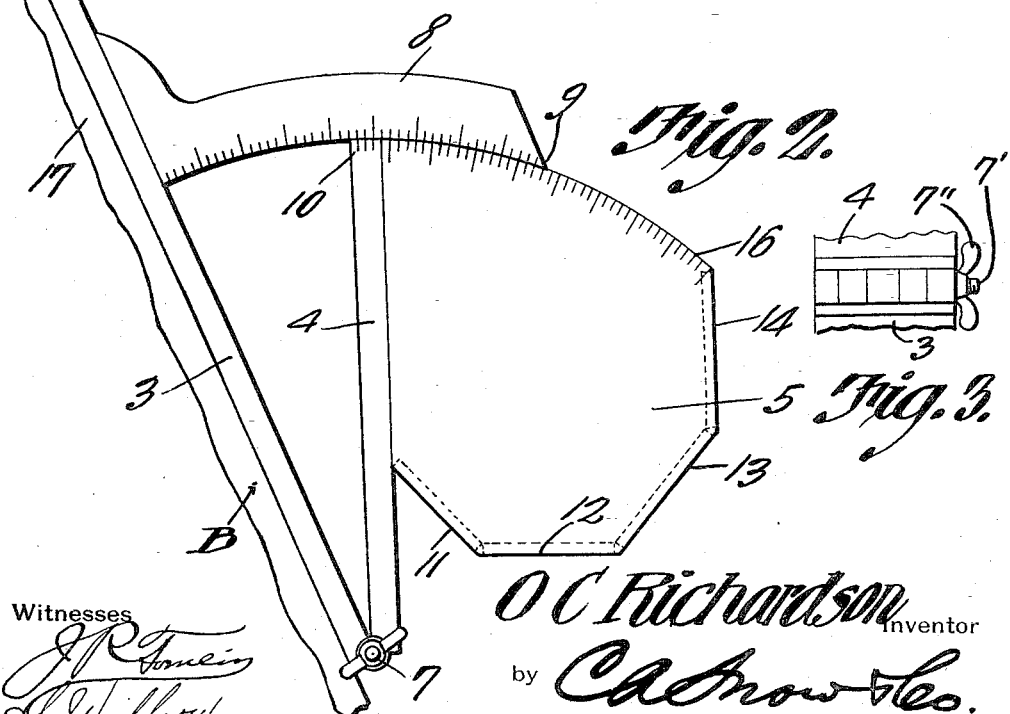

UNITED STATES PATENT OFFICE.

O C RICHARDSON, OF WAXAHACHIE, TEXAS.

MEASURING AND LEVELING INSTRUMENT.

1,127,809.　　　　Specification of Letters Patent.　　Patented Feb. 9, 1915.

Application filed December 27, 1913. Serial No. 809,016.

*To all whom it may concern:*

Be it known that I, O C RICHARDSON, a citizen of the United States, residing at Waxahachie, in the county of Ellis and State of Texas, have invented a new and useful Measuring and Leveling Instrument, of which the following is a specification.

This invention relates to a measuring and leveling instrument, and aims to provide a unique device of that character for determining in a convenient and efficient manner the angularity of a surface or object with respect to a vertical or horizontal line.

With the foregoing and other objects in view which will appear as the description proceeds, the invention resides in the combination and arrangement of parts and in the details of construction hereinafter described and claimed, it being understood that changes in the precise embodiment of the invention herein disclosed, can be made within the scope of what is claimed, without departing from the spirit of the invention.

In the drawings accompanying this specification and forming a part thereof, the preferred embodiment of my invention is illustrated, in which:—

Figure 1 is a side elevation of the improved instrument. Fig. 2 is a similar view and illustrating the same in actual use. Fig. 3 is a fragmental view of the pivotal connection between the stock and arm.

Referring to the drawings in which similar reference numerals designate corresponding parts throughout the several views, a stock or base 3 is provided, which is adapted to rest upon any surface or structure which is to be leveled or disposed at a predetermined angle, or the angle of which is to be measured. Pivotally connected to one end of the stock 3 is an arm 4 which carries a block 5 at its free end. The outermost marginal face 16 of the block 5 is curved about the pivotal connection 7 as a center and extends from the free end of the arm 4. The pivot bolt 7' as illustrated in Fig. 3, extends beyond the hinge butts and threadedly receives the wing nut 7" thereon by means of which the stock 3 and arm 4 may be held in various adjusted positions, or permitted to swing freely relative to one another. Rigidly secured to the stock and upstanding therefrom adjacent its free end, is a segmental member 8 which has a curved face matching the curved face 16 of the block 5, and which extends through an arc of 45 degrees. The upper extremity of the member 8 forms a pointer 9 coöperating with the curved face of the block 5. In this connection it is to be noted that the inner face 10 of the arm 4 also acts as a pointer coöperating with the segmental member 8.

The block 5 which is securely attached to and carried by the arm 4 is provided with a series of flat marginal faces 11, 12, 13 and 14 extending to that end of the curved face 16 remote from the arm 4. These flat faces are positioned at an angle of 135 degrees relative to one another, so that the said faces will define various angles with the arm. Embedded within each of the said flat faces is a spirit level 15 which allows the arm 4 to be readily placed at various positions or angles.

The block 5 is provided with a graduated protractor scale thereon adjacent the curved face 16, and which reads from zero to 45°. A second graduated scale may be plotted upon the segmental member 8 and will be plotted in terms of the natural sine of the angle, it being noted that other scales may be inscribed upon the segmental member 8 and block 5 if it be so desired and deemed advisable. Thus for instance in some cases it would be of advantage to plot a logarithmic sine scale upon the segmental member, but it will be readily appreciated that such changes in scales come within the spirit of the present invention.

The uses to which my device may be put are manifold and among which the following are mentioned:—In Fig. 2 a beam 17 is to be placed at an angle say of 107 degrees with respect to the horizontal. This may be easily and readily accomplished by placing the spirit level 15 of the face 12 horizontal and moving the beam 17 with the stock 3 of the instrument which rests thereagainst until the pointer 9 of the segmental member 8 will denote a scale reading of 17 degrees. Thus the face 12 being positioned at 90 degrees to the arm 4 and the angle between the arm 4 and the stock 3 being 17 degrees, the inclination of the beam 17 will be 107 degrees as required. In like manner a beam may be placed at any desired angle and without the arm 4 overrunning the segmental member 8.

The instrument may be used to straighten up objects or indicate their inclinations from a perpendicular or horizontal position. It may also be used to level rails, foundations, or similar structures or may be used to cut rafters to fit any degree of slope, as it is thought will be readily suggested during the practical use of the device.

Having thus fully described my invention, what I claim is:—

1. An instrument of the class described embodying a stock, an arm pivoted thereto, a block carried by the arm and having a series of marginal faces arranged at obtuse angles relative to one another, and a spirit level carried by each of the said faces, there being means for indicating the angularity between the stock and arm.

2. An instrument of the character described, embodying a stock; an arm pivoted thereto, a block carried by the arm adjacent its free end and having a marginal curved face extending from the free end of the arm and arranged concentric with the pivot of the said arm, the block having a series of marginal faces extending to that end of the said curved face remote from the arm, the faces of the said series being arranged at obtuse angles relative to one another, a spirit level carried by each face of the said series, and a member carried by the stock having a curved face matching the said curved face of the block, the block and said member having means for indicating the angularity between the stock and arm.

In testimony that I claim the foregoing as my own, I have hereto affixed my signature in the presence of two witnesses.

O C RICHARDSON.

Witnesses:
H. N. WOLFE,
J. E. MUNCHUS.

Copies of this patent may be obtained for five cents each, by addressing the "Commissioner of Patents, Washington, D. C."